US006952081B1

(12) United States Patent
Jansma et al.

(10) Patent No.: US 6,952,081 B1
(45) Date of Patent: Oct. 4, 2005

(54) FLUORESCENT LAMP HAVING ULTRAVIOLET REFLECTING LAYER

(75) Inventors: Jon B. Jansma, Pepper Pike, OH (US); Colleen M. Griffith, Broomfield, CO (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 10/631,109

(22) Filed: Jul. 31, 2003

(51) Int. Cl.[7] .......................... H01K 1/76; H01K 1/28; H01J 61/40
(52) U.S. Cl. ...................... 313/580; 313/635; 313/489
(58) Field of Search .................................. 313/567, 578, 313/580, 571, 637–643, 635, 489, 112, 110; 315/169.1, 169.3

(56) References Cited

U.S. PATENT DOCUMENTS

| 5,602,444 | A | 2/1997 | Jansma |
| 5,838,100 | A | 11/1998 | Jansma |
| 5,944,572 | A | 8/1999 | Soules et al. |
| 6,452,324 | B1 | 9/2002 | Soules et al. |
| 6,525,460 | B1 | 2/2003 | Soules et al. |
| 6,528,938 | B1 | 3/2003 | Jansma |

*Primary Examiner*—Joseph Williams
(74) *Attorney, Agent, or Firm*—Pearne & Gordon LLP

(57) ABSTRACT

A fluorescent lamp with an ultraviolet reflecting barrier layer between the glass envelope and the phosphor layer(s). The barrier layer is a blend of gamma alumina, alpha alumina and theta alumina, such as 5–80 weight percent gamma alumina, 5–80 weight percent alpha alumina, and 5–80 weight percent theta alumina.

15 Claims, 1 Drawing Sheet

FLUORESCENT LAMP HAVING ULTRAVIOLET REFLECTING LAYER

FIELD OF THE INVENTION

The present invention relates generally to fluorescent lamps and more particularly to a fluorescent lamp having an innovative ultraviolet reflecting barrier layer.

DESCRIPTION OF RELATED ART

Thin protective barrier coatings or layers applied adjacent or over the inner glass surface of fluorescent lamps have been used for improving lumen maintenance, reducing mercury consumption, reducing end discoloration and for specialized lamps that contain conductive starting aids. The coating or layer forms a barrier between the layer of phosphor particles and the glass bulb tubing or glass tube.

A fluorescent lamp barrier layer or coating typically comprises alumina or silica particles ranging in size from 10–100 nm in diameter; see U.S. Pat. No. 5,602,444, which is representative of the prior art. These layers are thin (generally less than 1 $\mu$m, usually less than 0.5 $\mu$m in thickness) and highly transparent to visible light. Some ultraviolet light is beneficially reflected back into the phosphor layer(s), however, the main purpose of the barrier layer is to provide a chemically inert boundary or separation layer between the phosphor layer and the glass.

There is a need for an improved barrier layer that effectively reflects UV light back into the phosphor layer. Efficient reflection of UV light is highly desirable due to the resulting improved phosphor utilization, which becomes particularly important when expensive rare earth phosphors are used. There is a further need for an effective barrier layer that can be provided at a low cost, and for a barrier layer in which a portion of the relatively more expensive gamma and alpha alumina is replaced with other lower-cost alumina.

SUMMARY OF THE INVENTION

A mercury vapor discharge lamp is provided, having a light-transmissive envelope having an inner surface, means for providing a discharge, a discharge-sustaining fill gas sealed inside said envelope, a phosphor layer inside the envelope and adjacent the inner surface of the envelope, and a barrier layer between the envelope and the phosphor layer. The barrier layer comprises a blend of gamma alumina, alpha alumina and theta alumina.

DETAILED DESCRIPTION OF THE PREFERRED EMBODIMENTS OF THE INVENTION

Figure 1:
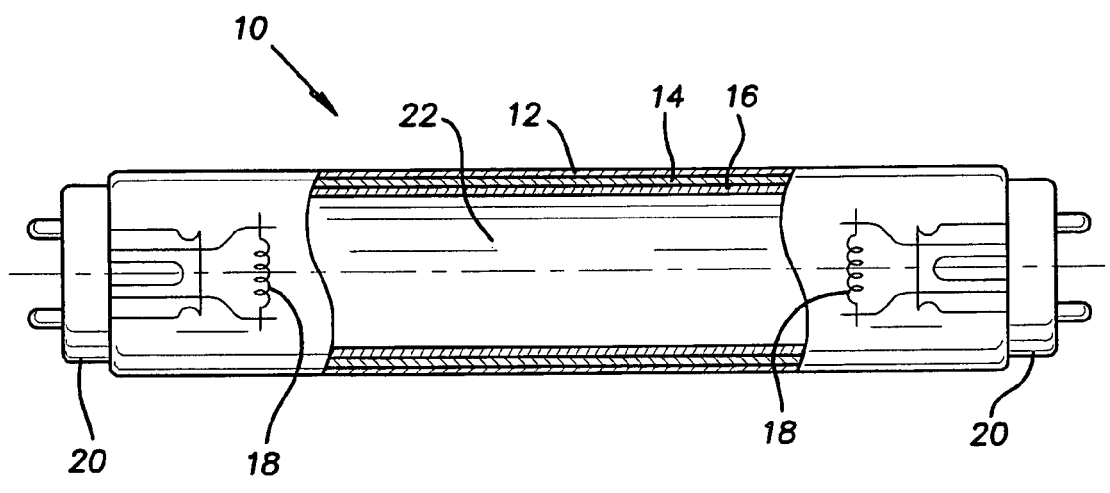
FIG. 1 shows diagrammatically, and partially in section, a fluorescent lamp according to the present invention.

In the description that follows, when a preferred range, such as 5 to 25 (or 5–25), is given, this means preferably at least 5, and separately and independently, preferably not more than 25. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal. Also as used herein, a "T8 lamp" is a fluorescent lamp as known in the art, preferably linear, preferably nominally 48 inches in length, and having a nominal outer diameter of 1 inch (eight times ⅛ inch, which is where the "8" in "T8" comes from). Less preferably, the T8 fluorescent lamp can be nominally 2, 3, 6 or 8 feet long, less preferably some other length.

With reference to FIG. 1, there is shown a representative low pressure mercury vapor discharge fluorescent lamp 10, which is generally well-known in the art. The fluorescent lamp 10 has a light-transmissive glass tube or envelope 12 that has a circular cross section. Though the lamp in FIG. 1 is linear, the invention may be used in lamps of any shape and any cross section. The inner surface of the envelope 12 is provided with an ultraviolet reflecting barrier layer 14 according to the present invention. The inner surface of the barrier layer 14 is provided with a phosphor layer 16, the barrier layer 14 being between the envelope 12 and the phosphor layer 16. Phosphor layer 16 is as known in the art. Phosphor layer 16 is preferably a rare earth phosphor layer, such as a rare earth triphosphor layer, but it may also be a halophosphate phosphor layer or any other phosphor layer as known in the art that absorbs UV light.

Optionally, other layers may be provided inside the envelope 12; for example, adjacent to or between the layers 14 and 16, such as for example multiple phosphor layers may be provided, for example a halophosphate phosphor layer may be provided between the barrier layer and a rare earth triphosphor layer.

The fluorescent lamp 10 is hermetically sealed by bases 20 attached at both ends and, in lamps having electrodes (such as in FIG. 1), a pair of spaced electrodes or electrode structures 18 (to provide an arc discharge) are respectively mounted on the bases 20. The pair of spaced electrodes is a means for providing a discharge. A discharge-sustaining fill gas 22 is provided inside the sealed glass envelope, the fill gas being typically an inert gas such as argon or a mixture of argon and other noble gases such as krypton at a low pressure in combination with a small quantity of mercury to provide the low vapor pressure manner of lamp operation.

The invented ultraviolet reflecting barrier layer is preferably utilized in a low pressure mercury vapor discharge lamp, but may also be used in a high pressure mercury vapor discharge lamp. The invented barrier layer may be used in fluorescent lamps having electrodes as is known in the art, as well as in electrodeless fluorescent lamps as are known in the art, where the means for providing a discharge is a structure which provides high frequency electromagnetic energy or radiation.

The barrier layer of the present invention beneficially reflects UV light back into the phosphor layer or layers where it may be utilized, leading to improved phosphor utilization and more efficient production of visible light. Lamps with the invented barrier layer also 1) require lower quantities of mercury, 2) have lower UV emission, 3) have a recyclable design in that the triphosphors are more easily reclaimed, and 4) have an improved appearance due to the opaque white barrier layer.

The invented barrier layer 14 contains a blend of gamma alumina particles, alpha alumina particles, and theta alumina particles. These different forms, or phase structures, of alumina can be readily detected using X-ray diffraction methods. The gamma alumina particles have a surface area of 30–140, more preferably 50–120, more preferably 80–100, $m^2$/gm and a particle size (diameter) of preferably 10–500, more preferably 30–200, more preferably 50–100, nm. The alpha alumina particles have a surface area of 0.5–15, more preferably 3–8, more preferably 4–6, more preferably about 5, m²/gm and a particle size (diameter) of preferably 50–5000, more preferably 100–2000, more preferably 500–1000, more preferably about 700, nm. The theta alumina particles have a surface area of 5–100, more preferably 10–80, more preferably 20–65, more preferably 30–50, more preferably about 38, m²/gm and a particle size (diameter) of preferably 0.2–1, more preferably 0.3–0.8, more preferably 0.4–0.6, more preferably about 0.5, µm.

By providing a blend of three alumina particles, namely gamma, alpha and theta, advantages over the two alumina particle blend, namely gamma and alpha, are realized. Such advantages include, but are not limited to, a significant overall cost reduction and substantial preservation of the properties associated with the two alumina particle blend, including such properties as UV reflection, initial lumens, lumen maintenance, appearance, and reduced mercury penetration.

The alumina particle blend in the invented barrier layer is preferably 5–80, more preferably 10–65, more preferably 20–55, more preferably 25–45, more preferably 30–40, more preferably about 33, weight percent gamma alumina, preferably 5–80, more preferably 10–65, more preferably 20–55, more preferably 25–45, more preferably 30–40, more preferably about 33, weight percent alpha alumina, and preferably 5–80, more preferably 10–65, more preferably 20–55, more preferably 25–45, more preferably 30–40, more preferably about 33, weight percent theta alumina.

The barrier layer 14 is provided on the lamp, such as a T8 fluorescent lamp, as follows. The gamma alumina, alpha alumina, and theta alumina particles are blended by weight. The particles should be substantially pure or of high purity substantially without light-absorbing impurities or with a minimum of light-absorbing impurities. The alumina particle blend is then dispersed in a water vehicle with a dispersing agent such as ammonium polyacrylate and optionally other agents known in the art, the resulting suspension being about 5–15 weight percent alumina and 1–3 weight percent dispersing agent, or other relative percentages as known in the art. The suspension is then applied as a coating to the inside of the glass tube or envelope and heated, as phosphor coatings are applied and heated, which is known in the art. In the heating stage the non-alumina components are driven off, leaving only the alumina behind. The barrier layer is applied so that the weight of alumina in the coating or barrier layer (the "coating weight") is 0.1–3, more preferably 0.3–1, more preferably 0.5–0.7, more preferably about 0.6, mg of alumina per cm².

When a low pressure mercury vapor discharge lamp is provided with a barrier layer according to the present invention, reflectance of UV light (particularly at 254 nm), relative to barium sulfate, is preferably at least 50%, more preferably at least 70%, more preferably at least 80%, more preferably at least 90%, preferably about 70–95%, more preferably about 80–90%.

The following Example further illustrates various aspects of the invention. All percentages are weight percent unless otherwise indicated.

EXAMPLE 1

A test was conducted to determine whether the invented gamma alumina, alpha alumina, theta alumina blend (see Table 2) could perform as well as the more expensive conventional gamma alumina, alpha alumina blend (see Table 1). If so, the invented lower cost blend can be substituted for the more expensive conventional material with no substantial loss of performance. The results of this test are shown in Tables 1 and 2. YEO refers to yttrium oxide activated with europium, a red emitting phosphor. LAP refers to lanthanum phosphate activated with cerium and terbium, a green emitting phosphor. SECA refers to strontium, calcium, barium chlorapatite activated with europium, a blue emitting phosphor. The lamp type is a T8 32W 48 inch lamp. "g/b" means grams per bulb.

TABLE 1

| Lamp Type | Nom Color Temp | Barrier Coating Composition of First Coating | Phosphor Weight Composition of Second Coating | x | y | Ra | 100 hr lms/W |
|---|---|---|---|---|---|---|---|
| Standard SP41 T8 32 W 48" lamp | 4100 K | 75% alpha 25% gamma coated at 0.4 g/b | 0.54 g YEO 0.34 g LAP 0.12 g SECA | 0.381 | 0.382 | 81 | 75 |

TABLE 2

| Lamp Type | Nom Color Temp | Barrier Coating Composition of First Coating | Phosphor Weight Composition of Second Coating | x | y | Ra | 100 hr lms/W |
|---|---|---|---|---|---|---|---|
| SP41 T8 32W 48" lamp | 4100 K | 33% alpha 33% gamma 33% theta alumina coated at 0.4 g/b | 0.54 g YEO 0.34 g LAP 0.12 g SECA | 0.380 | 0.380 | 81 | 75 |

The test results show that the invented barrier layer of gamma, alpha and theta alumina produces substantially the same results as the conventional, more expensive barrier layer of gamma and alpha alumina. These results were both surprising and unexpected.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mercury vapor discharge lamp comprising a light-transmissive envelope having an inner surface, means for providing a discharge, a discharge-sustaining fill gas sealed inside said envelope, a phosphor layer inside the envelope and adjacent the inner surface of the envelope, and a barrier layer between the envelope and the phosphor layer, the barrier layer comprising a blend of gamma alumina, alpha alumina and theta alumina.

2. The lamp of claim 1, wherein said blend of gamma alumina, alpha alumina and theta alumina is 5 to 80 weight percent gamma alumina, 5 to 80 weight percent alpha alumina, and 5 to 80 weight percent theta alumina.

3. The lamp of claim 1, wherein said blend of gamma alumina, alpha alumina and theta alumina is 5–80 weight percent gamma alumina, 5–80 weight percent alpha alumina, and 25–45 weight percent theta alumina.

4. The lamp of claim 1, wherein said blend of gamma alumina, alpha alumina and theta alumina is 25–45 weight percent gamma alumina, 25–45 weight percent alpha alumina, and 25–45 weight percent theta alumina.

5. The lamp of claim 1, wherein said blend of gamma alumina, alpha alumina and theta alumina is about 33 weight percent gamma alumina, about 33 weight percent alpha alumina, and about 33 weight percent theta alumina.

6. The lamp of claim 1, wherein said alumina blend is present in said barrier layer in a coating weight of 0.1 to 3 mg/cm$^2$.

7. The lamp of claim 2, wherein said alumina blend is present in said barrier layer in a coating weight of 0.3 to 1 mg/cm$^2$.

8. The lamp of claim 1, wherein said phosphor layer is a rare earth phosphor layer.

9. The lamp of claim 8, further comprising a halophosphate phosphor layer between said barrier layer and said rare earth phosphor layer.

10. The lamp of claim 1, wherein said gamma alumina has a surface area of 30 to 140 m$^2$/gm, said alpha alumina has a surface area of 0.5 to 15 m$^2$/gm, and said theta alumina has a surface area of 10–80 m$^2$/gm.

11. The lamp of claim 1, wherein said gamma alumina has a surface area of 50–120 m$^2$/gm, said alpha alumina has a surface area of 3–8 m$^2$/gm, and said theta alumina has a surface area of about 38 m$^2$/gm.

12. The lamp of claim 1, wherein said alumina blend is present in said barrier layer in a coating weight effective to provide at least 70% reflectance relative to barium sulfate of UV light at 254 nm.

13. The lamp of claim 1, wherein said alumina blend is present in said barrier layer in a coating weight effective to provide at least 80% reflectance relative to barium sulfate of UV light at 254 nm.

14. The lamp of claim 1, said lamp being a low pressure mercury vapor discharge lamp having a pair of spaced electrodes.

15. The lamp of claim 1, wherein said barrier layer consists essentially of a blend of gamma alumina, alpha alumina and theta alumina.

* * * * *